April 5, 1938.  J. W. BAER  2,113,126
CLOSURE AND CONNECTION TERMINAL FOR ELECTROLYTIC CELLS
Filed Feb. 23, 1935
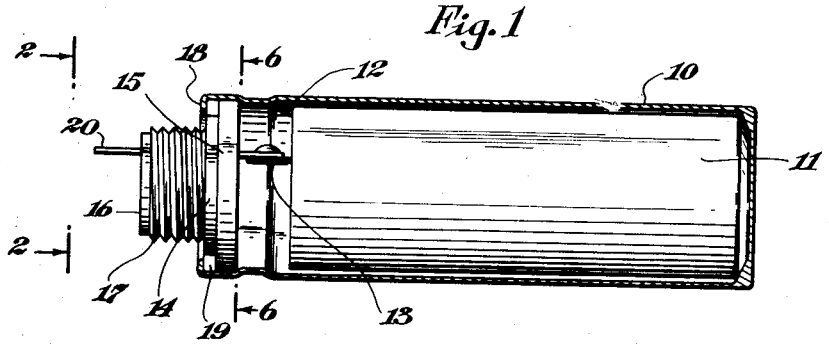
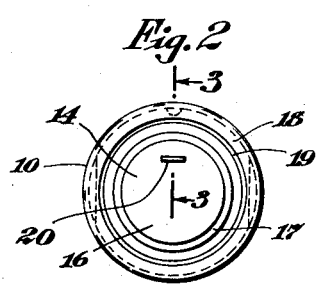
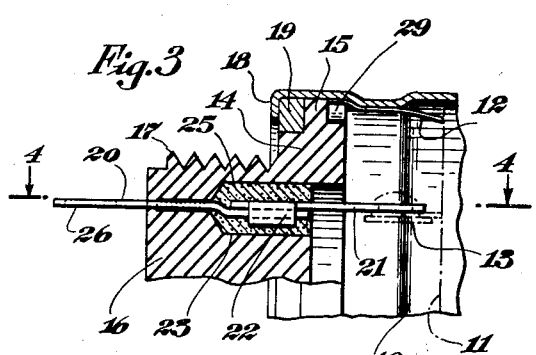
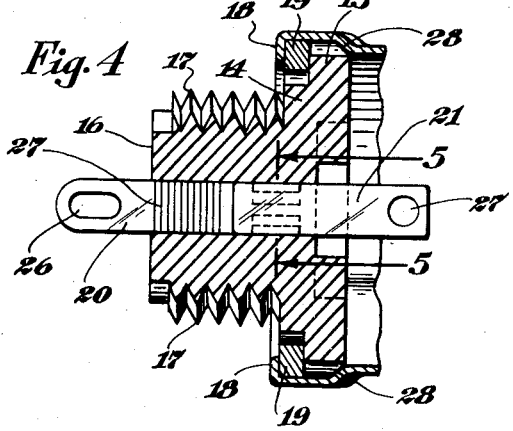
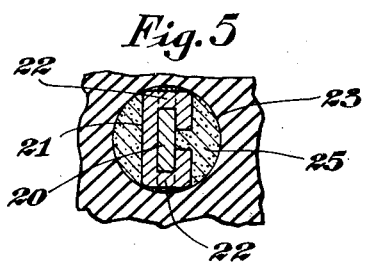
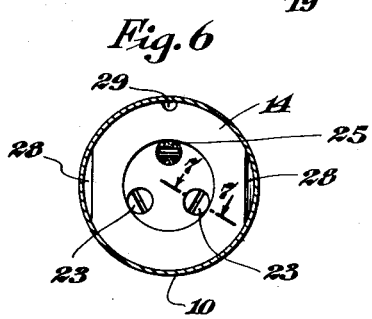
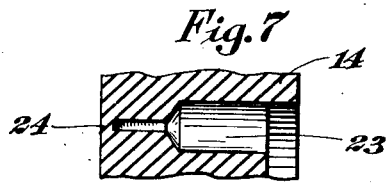
INVENTOR,
John W. Baer,
BY Frederick Breitenfeld
ATTORNEY.

Patented Apr. 5, 1938

2,113,126

UNITED STATES PATENT OFFICE

2,113,126

CLOSURE AND CONNECTION TERMINAL FOR ELECTROLYTIC CELLS

John W. Baer, Woodside, Long Island, N. Y., assignor to Condenser Corporation of America, Jersey City, N. J., a corporation of New York Application February 23, 1935, Serial No. 7,773

1 Claim. (Cl. 175—315)

My present invention relates generally to electrolytic cells, and has particular reference to an improved closure and connection terminal for such cells.

While I have herein illustrated, and shall hereinafter describe, the invention as it may be applied to an electrolytic condenser of the so-called dry type, nevertheless it will be understood that many phases of the invention are not restricted to such a specific type of article.

It is, of course, well known that where two dissimilar metals are exposed to contact with an electrolyte, an electrolysis takes place which results in the deterioration of one or the other of the metals. In an electrolytic cell, therefore, which by its very nature requires the presence of an electrolyte, it is important that junctures of dissimilar metals be avoided.

Where the electrolytic cell is of the type which involves the employment of filmed aluminum or similar filmable metal, a difficulty is encountered in the provision of adequate means for establishing outside electrical connections to the cell because aluminum does not lend itself readily to soldering. In other words, if dissimilarity of metals is avoided within the cell, the connection terminal projecting out of the exterior of the cell is not well suited for the establishment of soldered connection with outside leads or the like.

To overcome this difficulty, attempts have been made to employ a connection terminal composed of a metal readily adapted to soldering (such as copper) and to paint or similarly coat that portion of the terminal which projects into the cell. Another prior effort to overcome the difficulty consists in wrapping or enveloping the cell body for the purpose of preventing the electrolyte therein to come into contact with the connection terminal. Neither of these modes of construction are entirely satisfactory, since they are relatively expensive, and since positive assurance can never be attained that the electrolyte will not come into contact with the connection terminal.

It is an object of my present invention to provide a construction in which, in an inexpensive and entirely feasible manner, contact between dissimilar metals and the electrolyte is positively prevented; and in which, nevertheless, advantage is taken of the desirability of having the inner portion of the connection terminal of one metal and the outer portion of a dissimilar metal more readily adapted to soldering.

It is a feature of my invention to provide a connection terminal which is composed of two dissimilar metallic strips arranged end to end with their contiguous ends in overlapping, clenched relationship. One of the metallic pieces is of filmable metal such as aluminum, while the other is of a metal more readily adapted to soldering, e. g., tinned copper. The connection terminal is employed in association with an insulating closure which is so constructed as to permit the juncture between the two dissimilar metals to be completely enclosed within the confines of the closure.

More particularly, it is a feature of my invention to provide a closure in the form of an insulating body provided with at least one longitudinal bore adapted to accommodate the connection terminal, with the juncture point disposed within the bore. This permits the bore thereafter to be plugged up with an insulating material such as rubber or pitch, thereby effectively enveloping and completely enclosing the joint between the dissimilar metals.

A further feature of my invention lies in providing a closure in the form of a molded body which is adapted to be used to accommodate, at will, one or more connection terminals. The closure is characterized by the provision of a plurality of longitudinal bores, each of which is sealed at its outer end by a web of frangible material integral with the closure. Thus, where one connection terminal is to be mounted in the closure, it is inserted into one of the bores and the web is punctured by the connection terminal itself; the other bores remain untouched and hence sealed.

I achieve the foregoing objects, and such other objects as may hereinafter appear or be pointed out, in the manner illustratively exemplified in the accompanying drawing, wherein—

Figure 1 is a cross-sectional view through an electrolytic cell, constructed in accordance with my present invention;

Figure 2 is an end view taken substantially along the line 2—2 of Figure 1;

Figure 3 is an enlarged cross-sectional view taken substantially along the line 3—3 of Figure 2;

Figure 4 is an enlarged cross-sectional view taken substantially along the line 4—4 of Figure 3;

Figure 5 is an enlarged cross-sectional view taken substantially along the line 5—5 of Figure 4;

Figure 6 is a cross-sectional view taken substantially along the line 6—6 of Figure 1; and Figure 7 is a fragmentary cross-sectional view taken substantially along the line 7—7 of Figure 6.

I have chosen to illustrate the present invention in connection with a dry electrolytic condenser structure which consists broadly of the metallic can 10 and the cell body 11 accommodated therein. This body comprises interwound strips of filmable foil, such as aluminum, with a suitable spacing medium, such as gauze, paper, or the like, between the foils, and with an electrolyte carried by the spacing medium. One of the foil strips is unfilmed and serves as the cathode of the unit. This strip is connected by means of a tab 12 with the can 10, whereby the latter serves as an exterior connection terminal for the cathode side of the device. The other foil is provided with an electrolytically deposited film serving as the dielectric of the condenser. The foil upon which this film is formed constitutes the anode of the device, and electrical connection is established thereto by means of the tab 13.

In accordance with my present invention, one end of the can 10 is provided with the closure plug 14 which is in the form of an integral body, preferably molded, having a flange-like base 15 and an attachment projection 16 of reduced cross-sectional area. In the form illustrated, the projection 16 is provided with the exterior threads 17, so that the entire device may be mounted upon a chassis or the like by inserting the projection 16 through an opening and securing a nut or the like onto the threads 17. The closure is mounted in the end of the container by spinning the end 18 of the container inwardly over the base 15, and preferably with the aid of an interposed resilient washer 19.

The present invention relates to the closure 14, and to the connection terminal or terminals which extend through it to establish connection with the anode or anodes of the cell.

In the illustrated form, there is only a single anode foil and, therefore, only a single connection tab 13 to which electrical connection must be made.

The connection terminal which I provide is composed of two metallic strips 20 and 21, the contiguous ends being arranged in overlapped relationship, as shown most clearly in Figures 3 and 4, and one of the strips having lateral tabs 22 adapted to be crimped around the other strip, as shown most clearly in Figure 5. This physical interconnection of the two strips results in the provision of a unitary connection terminal whose opposite ends are of dissimilar metals. In accordance with my invention, the strip 21, i. e., the one which projects into the container, is of aluminum or similar filmable metal; and the strip 20, i. e., the one which is adapted to project outwardly, is composed of a metal more readily adapted to receive solder. This metal may be copper, tinned copper, or the like.

In accordance with my invention, the closure is provided with at least one longitudinal bore 23 which extends through the attachment projection 16 and normally terminates in a thin, frangible web 24 (see Figure 7) integral with the material of the closure 14. The inner part of the bore 23 is relatively enlarged, and the outermost portion of it is relatively small so as to accommodate the strip 20 in a snug manner.

When the connection terminal is applied to the closure, it is inserted into the bore from the inside, and it is forcibly pushed outwardly through the web 24 so that it assumes the position of Figure 3. A mass of rubber or pitch 25 is then inserted into the bore so as to seal in the clenched juncture between the strips 20 and 21. The result is that the connection terminal is firmly embedded within the closure plug, with the inner end composed of one metal, and the outer end composed of a dissimilar metal, and with the juncture between the two pieces completely enclosed and sealed within the confines of the closure plug.

The construction of the device is then completed by riveting the tab 13 to the end of the strip 21, it being understood that this procedure must be performed before the end 18 of the can or container is spun around the closure, as shown in Figure 1.

The fact that the connection terminal was forcibly pushed through the web 24 assures a tight joint at this point, and in the completed device it is obvious that all of the parts within the container are of filmable metal, and hence unsusceptible to the generation of any undesired electrolysis. The exposed portion of the connection terminal is nevertheless of a material which readily receives solder.

It frequently happens that the cell body 11 is composed of one cathode foil interwound with more than one anode foil. For example, two or even three anode foils may be interwound with a single cathode foil. In such an event, additional connection terminals must be provided for, and in accordance with the present invention this is accomplished by providing a plurality of bores 23 within the closure plug when the latter is manufactured. In Figure 6, for example, it will be observed that the uppermost bore accommodates the connection terminal illustrated in Figures 1, 3, and 4. The other two bores 23, however, remain in their normal state, and the web 24 at the outer end of each bore keeps the closure entirely sealed. These two additional bores obviously fulfill no function in a device of the character illustrated in Figure 1, where only one anode is involved. However, it is obvious that the same closure could be used for a cell involving two or three anodes. In other words, whenever an extra connection terminal is to be mounted in the closure, it is a relatively simple matter to force it outwardly through one of the bores 23 and then to seal up the inner end of the bore, as illustrated and described in connection with Figure 3.

While I prefer to construct the closures with three bores 23, for the reason that three anodes are usually the maximum provided for in a cell of this character, nevertheless it will be understood that closures having two such bores, or more than three such bores, fall within the scope of the present invention.

It will also be understood that the invention is not restricted to an electrolytic condenser, and that the form of closure and the mode of assembling the connection terminal and the manner of mounting the connection terminal within the closure, constitute improvements which are applicable to electrolytic cells in general.

The openings 26 and 27 in the strips 20 and 21, respectively, are intended to facilitate connections at these points. The knurling 27 on the strip 20 helps to seal the connection between this strip and the walls of the narrowed portion of the bore 23 in which it is accommodated. The beveled portions 28 of the closure keep the same from being rotated after its assembly with the container. The opening 28 facilitates the accommodation and securing of the cathode lead 12.

The cell body 11 has not been illustrated in detail, because its general nature will be understood by those skilled in the art.

In general, it will be understood that changes in the details, herein described and illustrated for the purpose of explaining the nature of my invention, may be made by those skilled in the art without departing from the spirit and scope of the invention as expressed in the appended claim. It is, therefore, intended that these details be interpreted as illustrative, and not in a limiting sense.

Having thus described my invention, and illustrated its use, what I claim as new and desire to secure by Letters Patent is—

In an electrolytic condenser of the dry type; a metallic container; a condenser body within the container, said body including a connection tab of filmable metal; an insulating preformed plug constituting a closure for said container, said plug having a connecting neck, an inwardly facing recess, and an aperture therethrough connecting with the bottom of said recess; a terminal mounted in said recess and consisting of two metallic strips, one of said strips being of the same filmable metal as said tab and the other of said strips of different metal readily adapted to soldering and projecting outwardly from said plug through said aperture at the bottom of said recess and substantially filling said aperture; a solid substance impervious to the electrolyte of said condenser sealing said terminal in said recess and preventing said electrolyte from attacking the joint of said terminal formed by said strips of dissimilar metal; means connecting said filmable strip with said tab; and deformations of said container, made after assembly of said body and plug in said container, for securing said plug to said container so that it serves as a closure therefor.

JOHN W. BAER.